United States Patent Office 3,396,431
Patented Aug. 13, 1968

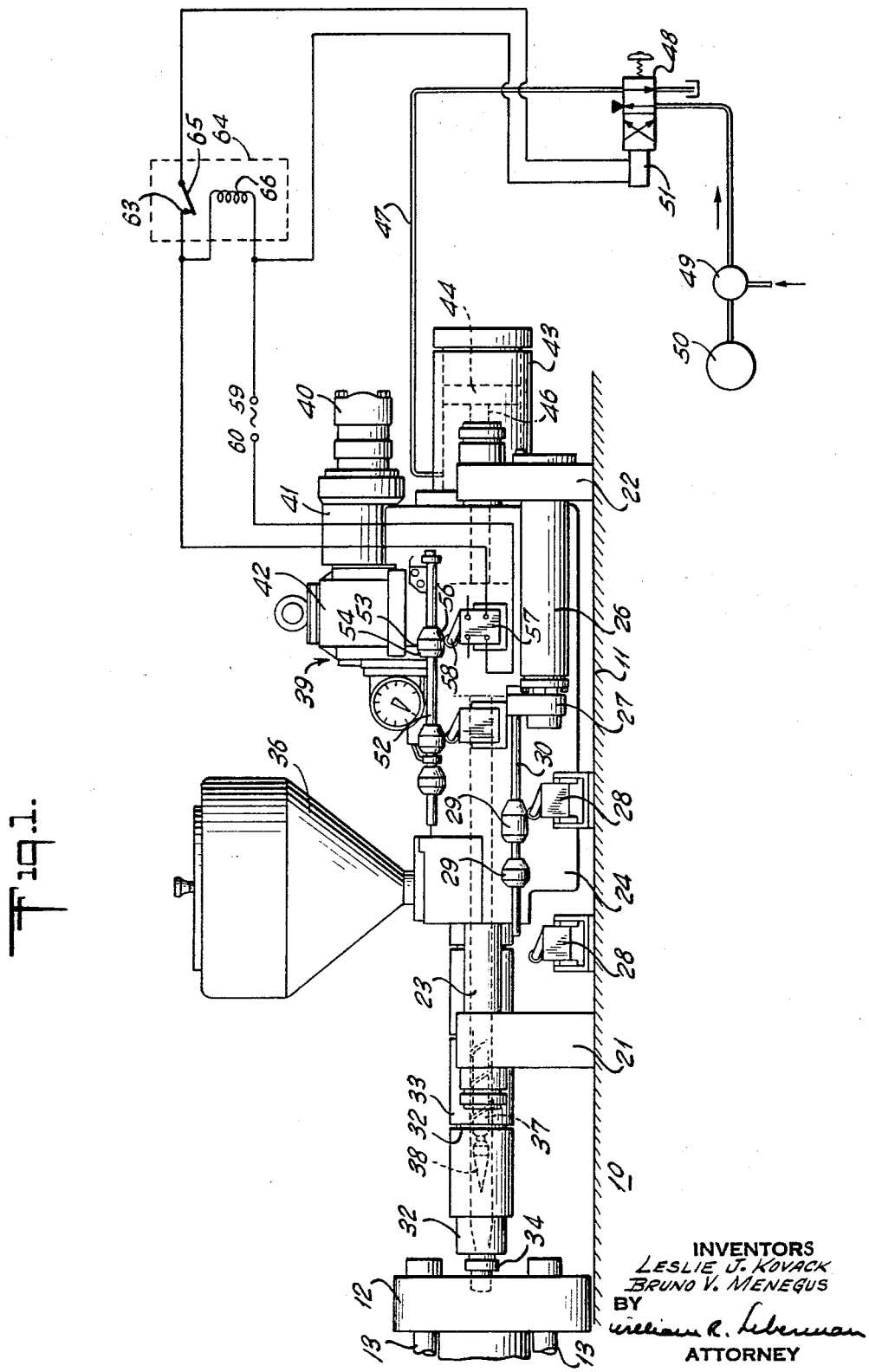

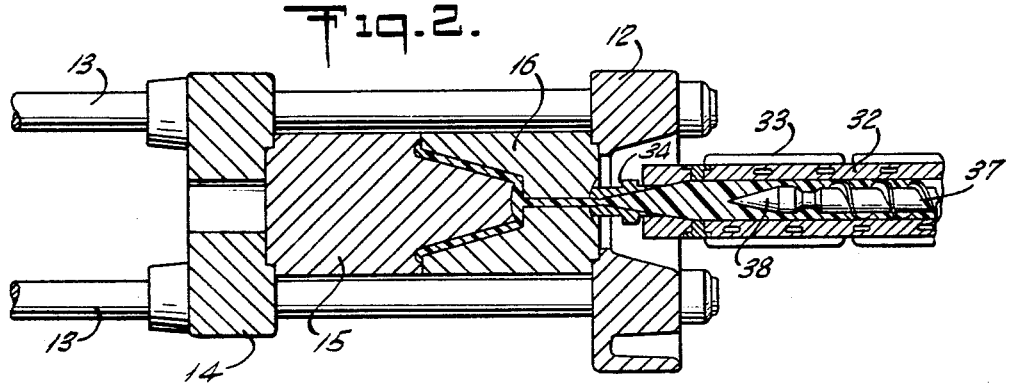
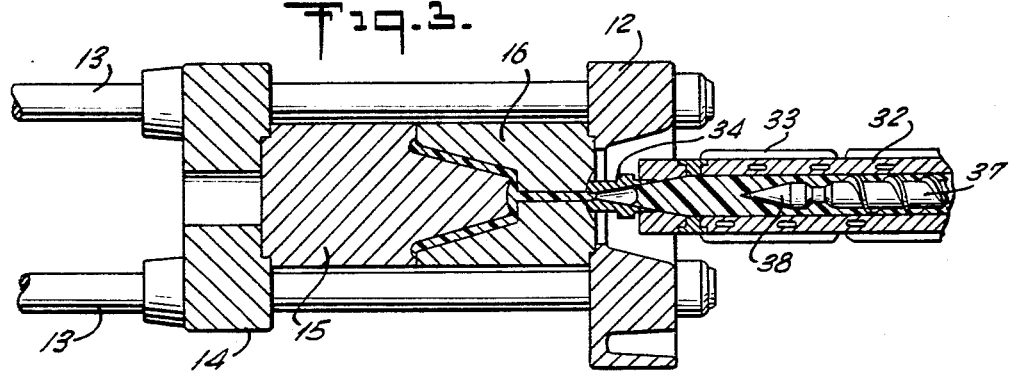
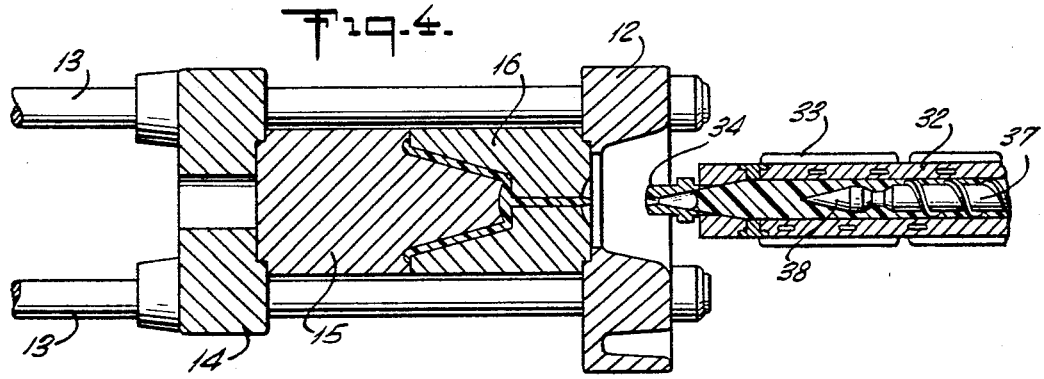
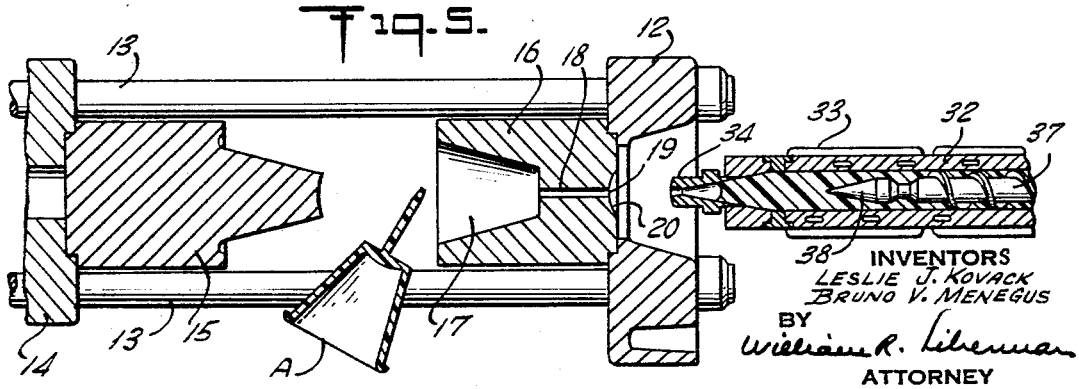

3,396,431
SCREW INJECTOR FOR PLASTIC MATERIAL
Leslie J. Kovach, Clifton, and Bruno V. Menegus, Wayne, N.J., assignors to Modern Plastic Machinery Corporation, Clifton, N.J., a corporation of Delaware
Filed Apr. 7, 1965, Ser. No. 446,268
9 Claims. (Cl. 18—30)

ABSTRACT OF THE DISCLOSURE

A screw injector includes a rotatable screw which is axially movable in an extruder barrel and is connected to the piston of a double acting hydraulic cylinder. A motor rotates the screw to effect the axial retraction thereof and actuates a switch at a predetermined retracted position which in turn actuates a valve for an adjustable time to introduce a hydraulic fluid into the cylinder to further axially retract the screw a predetermined distance without rotation thereof whereby to withdraw any of the plastic from the extruder nozzle.

---

The present invention relates generally to improvements in extrusion apparatus and it relates particularly to an improved screw injection apparatus for plastic materials.

An apparatus which is employed to great advantage in the injection molding of articles formed of thermoplastic synthetic resins is the screw injector extruder. The conventional screw injector extruder is employed with a die member having a passageway or sprue provided with a rearwardly facing socket inlet and includes an axially movable heated barrel having a leading extrusion nozzle movable with the barrel into and out of coupling engagement with the die socket. A feed screw member is located in the barrel and is rotatable and axially movable therein and is connected at its trailing end to a hydraulic cylinder. Means are provided for rotating the screw. A control and sequencing system effects the axial non-rotating advance of the feed socket by means of the hydraulic cylinder to extrude fluid plastic into the closed mold cavity. Upon completion of the extrusion stroke the hydraulic cylinder is connected to discharge and the feed screw is rotated to cause the retraction thereof. While the screw injector extruder possesses many desirable features it has a serious drawback which adversely affects its position. The fluid plastic frequently flows from the disengaged nipple and accumulates along the face thereof or accumulates in the sprue and interferes with the proper operation of the apparatus. This accumulation of plastic adversely affects the optimum coupling between the extruder nipple and the die socket and the flow of fluid plastic from the extruder through the sprue into the die cavity.

It is, therefore, a principal object of the present invention to provide an improved extrusion device.

Another object of the present invention is to provide an improved apparatus for the injection molding of thermoplastic resins.

Still another object of the present invention is to provide an improved screw injection molding apparatus.

A further object of the present invention is to provide an improved screw injector apparatus wherein the accumulation of extruded resin in the sprue or at the faces of the coupling nipple and socket is prevented.

Still a further object of the present invention is to provide an apparatus of the above nature characterized by its simple adaptability to conventional equipment, its flexibility, and reliability.

The above and other objects of the present invention will become apparent from a reading of the following description taken in conjunction with the accompanying drawings, wherein:

FIGURE 1 is a fragmentary front elevational and diagrammatic view of a screw injector apparatus constructed according to and embodying the present invention; and FIGURES 2 to 5 are fragmentary front elevational views thereof illustrating successive positions of the apparatus during a part of an injection cycle.

In a sense, the present invention contemplates the provision of a screw injector apparatus comprising a barrel member, a rotatable and axially movable screw member registering with said barrel member, means for rotating said screw member, means for axially advancing said screw member, and means for retracting said screw member independently of the rotation thereof. According to a preferred form of the present apparatus, the barrel member terminates in a nozzle and is axially movable to bring the nozzle into and out of engagement with the mating trailing socket of a suitably supported stationary mold. A double-ended hydraulic cylinder has a piston connected to the screw member and has its trailing end connected in the usual manner through a first valve to a source of fluid under pressure and has its leading end connected through a second solenoid controlled valve to said pressure fluid source. The second valve solenoid is connected to a source of current through a switch located in the path of a tripping element movable with the screw member to actuate the switch upon the screw member being retracted to a predetermined point attendant the rotation thereof thereby to effect the further non-rotating retraction of the screw member. Means are provided for adjusting the non-rotating stroke of the retracting screw member.

Referring now to the drawings which illustrate a preferred embodiment of the present invention, reference numeral 10 generally designates the improved screw injection apparatus which differs from screw injectors of known construction principally in the feed screw control and retraction mechanism and associated components in the manner hereinafter set forth. Specifically, the apparatus 10 includes a base plate 11 on the leading section of which is mounted a vertical stationary platen 12 which suitably supports upper and lower parallel pairs of track members 13, the leading ends of which are supported by a corresponding leading support member. A movable platen 14 is slidably mounted on track members 13. A hydraulic cylinder is connected to platen 14 to effect its movement toward and from the stationary platen 12. A stationary female mold member 16 is mounted on the leading face of platen 12 and includes a leading mold cavity 17 connected by a longitudinal sprue or passageway 18 with a rearwardly directed coupling socket 19 registering with a relatively large opening 20 formed in the stationary platen 12. A movable male mold member 15 is mounted on platen 14 and complements mold member 16.

Directed upwardly from base plate 11 are a pair of longitudinally spaced leading and trailing mounting plates 21 and 22 respectively which support a pair of transversely spaced longitudinal tracks 23. A carriage member 24 is longitudinally slidably mounted on tracks 23 and is movable thereon between an advanced and retracted position by a hydraulic cylinder 26 mounted on the front face of plate 22 directly above base plate 11. A bracket 27 depends from carriage 27 and is connected to the piston of hydraulic cylinder 26. A pair of longitudinally spaced switches 28 are positioned on base plate 11 and are provided with actuating arms located in the path of tripping cams 29 adjustably mounted along the length of a rod 30 supported by and movable with carriage 24. Tripping cams 29 are adjusted and switches 28 are associated with a control network in known manner to control the movement of carriage 24.

Mounted on and movable with carriage 24 is a longitudinally extending tubular extruder barrel 32 provided with conventional automatically regulated electrical heating collars 33 and terminating at its leading end in an axial extrusion nozzle 34 communicating with the interior of barrel 32. Nozzle 34 substantially mates and is in longitudinal alignment with sprue socket 19 and is provided with a curved leading face which complements the trailing face of socket 19 so that when carriage 24 is in its advanced position nozzle 34 is in mating sealed engagement with socket 19, the sprue 18 being in communicating alignment with the nozzle bore. Also mounted on carriage 24 is a feed hopper 36 which communicates with the trailing part of barrel 32 through an opening therein.

Extending along the length of barrel 32 and longitudinally movable therein is a rotatable feed screw 37 terminating at its leading end in a torpedo head 38. A feed screw drive assembly 39 is mounted on carriage 24 and includes a drive motor 40 coupled through a speed reducing mechanism 41 and a transmission unit 42 to feed screw 37 to effect rotation of feed screw 37 and to permit axial movement thereof in barrel 32. A double ended hydraulic cylinder 43 is supported by and movable with carriage 24 and extrusion barrel 32 and is coaxial with barrel 32. A piston 44 is associated with cylinder 43 and is connected by a rod 46 to the trailing end of feed screw 33, to permit axial movement thereof independently of its rotation. The trailing section of cylinder 43 is connected by way of a solenoid-controlled valve to a source of fluid under pressure in order to advance feed screw 37 axially attendant the injection step in the well known manner.

The leading section of the cylinder 43 is connected by way of a pipe 47 through a normally closed pressure-controlled valve 48 to the outlet of a hydraulic pump 49, the input to which is connected to a source of hydraulic fluid and which is driven by a suitably energized electric motor 50. Valve 48 is controlled by a solenoid 51, the energization of which effects the opening of valve 48.

A longitudinally extending rod 52 is suitably supported in the conventional manner for a longitudinal movement with feed screw 37, and carries a longitudinally adjustable switch tripping cam member 53 provided with an elongated cylindrical surface 54 and a trailing inclined cam surface 56. A normally open, ganged double-throw switch 57 is mounted on and stationary relative to carriage 24, and includes an actuating arm 58 located in the path of tripping member 53. The control for motor 40 is connected through one pair of contacts of switch 57 to deactivate motor 40 upon the actuation of switch 57 by tripping member 53 when feed screw 37 is retracted by the rotation thereof to a predetermined position to stop the rotation of feed screw 37 in the known manner.

Valve actuating solenoid 51 has one terminal connected to a first terminal 59 of a source of energizing current, the second terminal 60 of which is connected through a pair of normally open contacts of switch 57 to a normally closed contact 63 of an adjusalbte time delay relay 64, arm 65 of which is connected to the other terminal of solenoid 51. The time delay relay includes an actuating solenoid 66 connected between the relay contact 63 and current terminal 59. Thus, the closing of switch 57 effects the concurrent energization of solenoids 51 and 66, the latter effecting opening of valve 48 and the former, after an adjustable predetermined time, effecting opening of contact 63 to deenergize solenoid 51 and thereby close valve 48.

Considering now the operation of the improved screw injection apparatus described above in the injection step male mold member 15 is advanced by platen 14 into closed engagement with female mold member 16, as seen in FIGURE 2 of the drawing, with nozzle 34 in mating engagement with socket 19. The non-rotating feed screw 37 is then axially advanced in the usual manner by the introduction of fluid under pressure into the trailing section of cylinder 43 to force molten plastic from barrel 32 through nozzle 34 and sprue 18 to fill the mold cavity, the injected plastic being then cooled and solidified on the mold cavity. Following the injection step, motor 40 is energized to rotate feed screw 37 which moves rearwardly in barrel 32 until tripping member 53 engages actuating switch arm 58 and switch 57 to stop motor 40 and the rotation of feed screw 37, as aforesaid. Simultaneous therewith, actuated switch 57 completes the energizing circuit to the relay solenoid 66, and the solenoid 51 through the closed contacts 63, 65. The energized solenoid 51 opens valve 48 to introduce fluid under pressure into the leading section of cylinder 43 to retract further the feed screw 37 without rotation thereof, such further retraction sucking or withdrawing molten plastic from the area of nozzle 34 and socket 19. The energized solenoid 66, after a predetermined adjusted period, opens arm 65 to deenergize solenoid 51 and close valve 48, thereby to limit the non-rotating retraction stroke of feed screw 37, as shown in FIGURE 3. The time delay relay 64 is advantageously adjusted to effect a non-rotating retraction of feed screw 37 a distance between $\frac{1}{16}$ and $\frac{3}{8}$ inch. It should be noted that the tripping member section 54 is at least $\frac{3}{8}$ inch long.

Immediately following or approximately concurrently with the non-rotating retraction of feed screw 37, barrel member 32 and carriage 24 are retracted to disengage nozzle 34 from socket 19, as shown in FIGURE 4, by means of cylinder 26, in the usual manner. The mold is then opened by retracting the platen 14 and mold section 15 and the molded piece A ejected in the usual manner. It will be appreciated that the present apparatus may be operated without retracting the barrel 32 and nozzle 34 from socket 19 during each injection cycle. The above cycle is automatically repeated in the well known manner.

While there has been described and illustrated a preferred embodiment of the present invention it is apparent that numerous alterations, omissions and additions may be made without departing from the spirit thereof.

What is claimed is:

1. A screw injector apparatus comprising a barrel member adapted to contain a fluid plastic material, a rotatable and axially movable screw member registering with said barrel member, means for rotating said screw member to effect an axial rearward movement thereof through said plastic material, and means actuated in response to the position of said member to further axially positively retract said screw member independently of the rotation thereof and independently of the pressure of said plastic material.

2. A screw injector apparatus comprising a barrel member adapted to contain a fluid plastic material, a nozzle member mounted on the leading end of said barrel member and having a discharge orifice communicating with said barrel member, a rotatable and axially movable screw screw member registering with said barrel member, means for rotating said screw member to effect an axial rearward movement thereof through said plastic material, and means actuated in response to the axial position of said screw member in said barrel to further axially positively retract said screw member independently of the rotation thereof and independently of the pressure of said plastic material to withdraw said plastic material rearwardly through said nozzle orifice.

3. A screw injector apparatus comprising a barrel member adapted to contain a fluid plastic material, a nozzle member mounted on the leading end of said barrel member and having a discharge orifice communicating with said barrel member, rotatable and axially movable screw member registering with said barrel member, means for rotating said screw member to effect an axial rearward movement thereof through said plastic material, and means actuated in response to the axial position of said screw member in said barrel to further axially positively retract said screw member a predetermined distance independently of the rotation of said screw member and independently of the pressure of said plastic material to withdraw said plastic material rearwardly through said nozzle orifice.

4. The screw injector apparatus of claim 3 including means for adjusting said predetermined distance.

5. A screw injector apparatus comprising a mold member provided with a rearwardly directed socket, a barrel member adapted to contain a fluid plastic material, a nozzle mounted on the leading end of said barrel member and having a leading face confronting and in axial alignment with said socket and a discharge orifice communicating with said barrel member, means for axially moving said barrel member to retract said nozzle and to advance said nozzle into engagement with said socket, a rotatable and axially movable screw member, means for rotating said screw member to effect an axial rearward movement thereof through said plastic material, means actuated in response to the axial position of said screw member to further axially positively retract said screw member independently of the rotation thereof, and independently of the pressure of said plastic material and means for retracting said barrel upon said further axial retraction of said screw member.

6. A screw injector apparatus comprising a barrel member adapted to contain a fluid plastic material, an injection nozzle mounted at the leading end of said barrel and communicating therewith, a rotatable and axially movable screw member located in said barrel, a hydraulic cylinder including a piston connected and fixed against axial movement relative to said screw member, means for rotating said screw member whereby to effect the axial retraction thereof along said barrel member, a switch, means for actuating said switch upon said axial retraction of said screw member to a predetermined point, means including a solenoid actuated, normally closed valve connecting said cylinder to a source of hydraulic fluid under pressure for urging said piston and screw member axially rearwardly, and means responsive to the actuation of said switch for opening said valve.

7. A screw injector apparatus comprising a barrel member adapted to contain a fluid plastic material, an injection nozzle mounted at the leading end of said barrel and communicating therewith, a rotatable and axially movable screw member located in said barrel, a hydraulic cylinder including a piston connected and fixed against axial movement relative to said screw member, means for rotating said screw member whereby to effect the axial retraction thereof along said barrel member, a switch, means for actuating said switch upon said axial retraction of said screw member to a predetermined point, means including a solenoid actuated normally closed valve connecting said cylinder to a source of hydraulic fluid under pressure for urging said piston and screw member axially rearwardly, and means responsive to the actuation of said switch for opening said valve and for deenergizing said screw member rotating means.

8. A screw injector apparatus comprising a barrel member adapted to contain a fluid plastic material, an injection nozzle mounted at the leading end of said barrel and communicating therewith, a rotatable and axially movable screw member located in said barrel, a hydraulic cylinder including a piston connected and fixed against axial movement relative to said screw member, means for rotating said screw member whereby to effect the axial retraction thereof along said barrel member, a switch, means for actuating said switch upon said axial retraction of said screw member to a predetermined point, means including a solenoid actuated, normally closed valve connecting said cylinder to a source of hydraulic fluid under pressure for urging said piston and screw member axially rearwardly, and means responsive to the actuation of said switch for opening said valve for a predetermined time.

9. The apparatus of claim 8 including means for adjusting said predetermined time.

References Cited
UNITED STATES PATENTS

| | | | |
|---|---|---|---|
| 3,140,332 | 7/1964 | Brown | 264—329 |
| 3,001,233 | 9/1961 | Ernst | 18—12 X |
| 3,146,287 | 8/1964 | Kleine-Albers | 18—30 X |

WILBUR L. McBAY, *Primary Examiner.*